March 15, 1960 E. A. ROCKWELL 2,928,508
SLACK ADJUSTER APPARATUS
Filed June 22, 1955 2 Sheets-Sheet 1
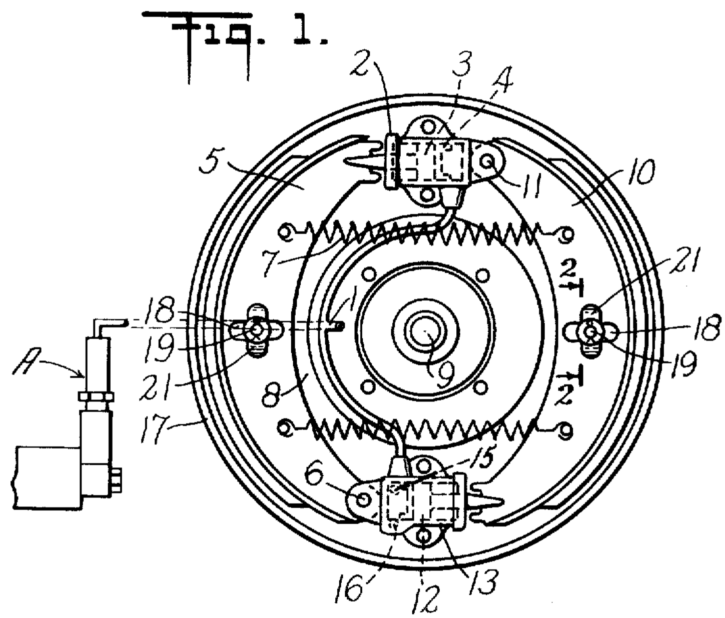
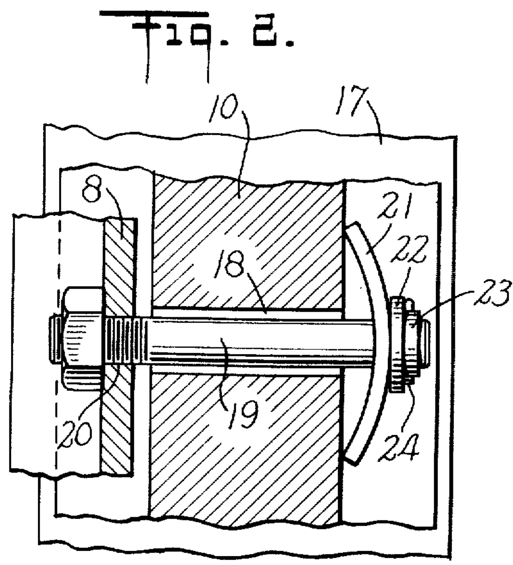
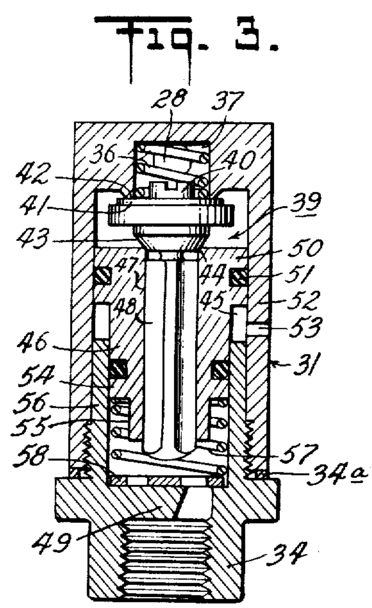
INVENTOR
Edward A. Rockwell
BY
Arthur Wright
ATTORNEY SLACK ADJUSTER APPARATUS
Filed June 22, 1955 2 Sheets-Sheet 2
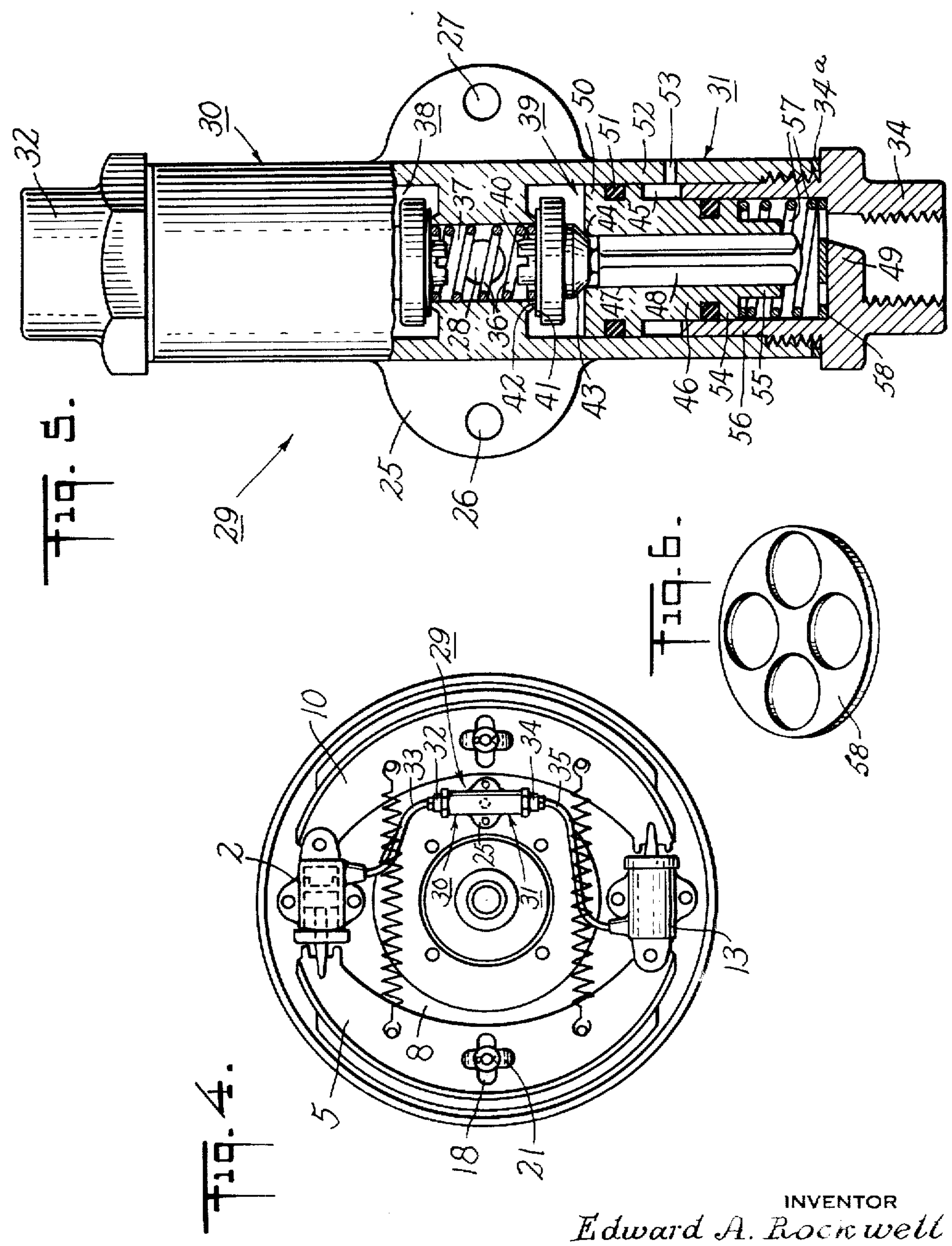
INVENTOR
Edward A. Rockwell
BY
Arthur Wright
ATTORNEY United States Patent Office 2,928,508 Patented Mar. 15, 1960

1

2,928,508

SLACK ADJUSTER APPARATUS

Edward A. Rockwell, Los Angeles, Calif.

Application June 22, 1955, Serial No. 517,271

5 Claims. (Cl. 188—152)

My invention relates particularly to an effective means for taking up the slack in various devices, but which has especial applicability to taking up slack in automotive vehicle brake systems or normally open clutch systems.

The object of my invention is to obviate the inaccuracy and ineffectiveness of the slack adjusters previously proposed by others in many different kinds of devices, but which has applicability especially to normally open engaging elements of such systems, as for instance between the brake shoes and brake drums of an automobile, or between normally open engaging elements of a clutch which are initially not in engagement with each other.

Hitherto many attempts have been made by others to obtain self-adjusting brakes, which, as is well known, are subject to progressive wear and resultant change of relative positions between the shoes and drum thereof. Some of said prior devices have involved the use of ratchet, and other irreversible, hydraulic means. All of said ideas proposed by others have failed in practice to provide the necessary accuracy and adjustment owing to the fact that when the drums expanded from excessive use, such irreversible adjusting means gave a clearance, but thereafter the brakes would drag as the drums become cool. Furthermore, in the previous hydraulic means the brake operating plungers had check valves which seated immediately on the first relaxation of pressure irrespective of the pressure being applied, thus trapping a variable clearance volume of liquid for the next operation of the brake. In accordance with my invention, however, not only are an accurate substantially constant clearance distance and clearance volume attained by seating a valve always at the same pressure to trap the same clearance volume of liquid in the off position of the brake, as, for instance, in my prior Patent No. 2,593,192, granted April 15, 1952, but by trapping the clearance volume of liquid within means, arranged in heat exchange relationship with the backing plate of the wheel brake, the contraction of the drum, upon cooling, will be compensated by the contraction of the brake fluid so as to tend to follow the contraction of the drum. Since the drums expand over a considerable period of time and cool off over a longer interval, subsequent operation of the brake automatically aligns the shoes to be operated. Also, as the arrangement in accordance with my invention is not merely a one-directional valve, the brake actuator will adjust its position regardless of the direction of travel. Furthermore, the backing plate may have two shoes with separate cylinder actuators, having associated therewith similar slack adjusting valves for operating the respective shoes. Also, with this arrangement, enabling separate automatic adjustment of the shoes to be attained, the shortest range of travel with maximum pedal pressure throughout the range of wear on the brake lining can be attained, thus eliminating frequent manual adjustment of the brakes which would otherwise be necessary, especially in cars having low pedal pressure and high overall leverage ratio of the brakes. Accordingly, with this construction it is not necessary to use a master cylinder having valve means therein for maintaining a particular pressure therefrom.

The object of my invention is, thus, to obviate the disadvantages in previous slack adjusters such as those referred to above. Further objects of my invention will appear from the detailed description of the same hereinafter.

While my invention is capable of embodiment in different forms, for the purpose of illustration I have shown only certain embodiments thereof in the accompanying drawings, in which—

Fig. 1 is a side elevation showing the mounting of the slack adjusters on the backing plate of the brake;

Fig. 2 is a horizontal section through one of the backing plates of the preceding figures, carrying a brake drum and brake shoes and the mounting of the latter thereon, taken on line 2—2 of Fig. 1;

Fig. 3 is a sectional view of a single slack adjuster as shown in Fig. 1;

Fig. 4 is a diagrammatic side elevation of a modified form of system containing a pair of the said slack adjusters;

Fig. 5 is an elevation partly in section of the pair of slack adjusters mounted together for operating the two wheel cylinders, respectively, of an automobile wheel; and Fig. 6 is a perspective view of a shim useful with the present invention.

In the drawings, the outlet port from a slack adjuster cylinder A constructed like one of the cylinders in Fig. 5 hereof, is connected by a pipe 1 to a brake cylinder 2 having a brake cylinder piston 3 therein provided with a lip seal 4, which is connected to a brake shoe 5 having a fixed pivot 6 and a pull-back spring 7 on a wheel backing plate 8 connected to an automobile driving or driven wheel axle 9. The wheel backing plate 8 also carries a brake shoe 10 in the usual way for cooperation with the brake shoe 5, similarly mounted on a fixed pivot 11 and operated, also, by a piston 12 in a brake cylinder 13 connected by a pipe 14 and a port 15 to the brake cylinder 13. A bleeder screw 16 for discharging accumulated air may be provided on the brake cylinder 13. The two shoes 5 and 10 are located adjacent to a brake drum 17 on the rim of the wheel. In order to guide the movement of the brake shoes 5 and 10 by the hydraulic pressure, each of the brake shoes is provided with a transverse slot 18 through which a bolt 19 passes through a hole 20 in the backing plate 8 so as to receive a leaf spring 21 on its end, held in place by a flanged ring 22 having a collar 23 through which a cotter pin 24 passes to maintain the spring 21 slightly compressed.

In the modification of my invention shown in Figs. 4 and 5, the slack adjuster is shown as applied to an automobile wheel brake in a similar but more advantageous way, the wheel brake elements being constructed the same as in Fig. 1. However, a separate slack adjuster is provided for operating each of the wheel cylinders 2 and 13. For this purpose I have provided a bracket 25 fastened by rivets 26 and 27 to the backing plate 8 which has an inlet opening 28. The inlet 28 enters the middle portion of a duplex cylinder 29, on the bracket 25, carrying two slack adjusters 30 and 31, both of which are constructed alike but each of which faces in the opposite direction to the other. The slack adjuster 30 has a screw-threaded outlet fitting 32 which is connected by a pipe 33 to the wheel brake cylinder 2, and the slack adjuster 31 has a screw-threaded fitting 34 leading to an outlet pipe 35 which is connected to the wheel brake cylinder 13. The internal construction of each of these slack adjusters 30 and 31 is the same. In the slack adjusters 30 and 31 there is present a valve-seating spring 36 located in a passageway 37 connected to the inlet opening 28. The opposite ends of the spring 36 rest, respectively, against the upper ends of plunger valves 38 and 39. Inasmuch as these two plunger valves 38 and 39 are constructed alike, only one will be described in detail. The plunger valve 39 has a central boss 40 as a guide for the helical spring 36, also a flat valve surface 41 seating against an annular valve seat 42 in the valve casing 29, and a conical valve 43 seating on a valve seat 44 within a cylindrical passageway 45 in a valve plunger 46 having a longitudinal passageway 47 through which a fluted valve stem 48 on the valves 41 and 43 passes. The outer end of the valve stem 48 is limited in its extreme possible path of movement, while the valve 43 is open, by a stop 49 on the outlet fitting 34. The valve plunger 46 has a large piston 50 and seal 51 in a large cylinder 52, provided with a venting opening 53, and a small piston 54 in a small cylinder formed by a sleeve 56 screw-threaded into the end of the cylinder 29, which forms an extension from the outlet plug 34. A helical spring 57 is adjustably supported by the outlet fitting 34 at one end and at the other end is against the plunger 46. Also, by the adjustment of the fitting 34 through the interposing of one or more washers 34*a* of suitable thickness between the plug and the adjuster 31, the clearance volume produced by the plunger valve stem 48 with relation to the differential pressures of the large piston 50 and the small piston 54, can be altered, if desired. In this way the clearance distance and clearance volume applied for the slack adjustment of each of the two shoes 5 and 10 can be attained, thereby economizing the amount of liquid used in the movement of the two wheel brake shoes 5 and 10 and thereby permitting the use of an extraordinarily short path of movement for the brake operating pedal, while at the same time attaining an extreme accuracy of adjustment of the clearance with regard to the two shoes 5 and 10, on each of the wheels, independently of one another. It will be noted, also, that in case additional adjustment of the position of the stop for the valve 43 is desired, this can be accomplished by introducing one or more shims or thin perforated plates 58 within the outlet plug 32.

In the operation of my invention, the liquid under manual pressure from a master cylinder will first displace the valve 41 from its seat 42 and move the plunger 46 forwardly while the conical valve 43 remains seated on the valve seat 44 until the valve stem 43 contacts with the stop 49, whereupon the valve 43 will open sharply and quickly with micrometric accuracy due to the differential pistons 50 and 54. Thereupon the valve 43 will remain unseated, after having transmitted quickly through the outlet the volume of liquid trapped by the plunger 46. Thereafter, the liquid under manual pressure will pass through the passageway in the plunger 46 to the brakes to apply the braking force thereto, the trapped liquid previously transmitted to the brakes having been applied in seating the brakes. Furthermore, when the valve 43 has been opened in this manner, liquid compensation will be effected between the two ends of the plunger 46. Upon starting to release the brakes the initial position will be that in which the shoes are still engaged, and with the fluid pressure substantially equal at the two ends of the plunger, but with the differential plunger still in its advanced position, with the valve seat 44 advanced a considerable distance beyond the conical valve 43, due to the differential pistons 50 and 54. Upon the further release of the pressure manually, the brake shoes 5 and 10 will become released or freed from the drum and the plunger 46 will continue its movement upwardly with the further decrease of the manual pressure until the valve seat 44 reaches the valve 43 when the force of the return spring 57 overcomes the differential pressures of the pistons 50 and 54, whereupon the valve 43 becomes sharply seated on its seat 44 and the valve stem leaves the stop 49, always at the same pressure in the outlet, determined by the force of spring 57. Thus, the same accurate clearance volume of liquid is trapped by the plunger 46 notwithstanding the amount of wear or heating that has taken place between the brake shoes 5 and 10 and the drum in the successive operation of the brakes. In this way the brake will always operate with the same clearance distance since always the same clearance volume of fluid is trapped. Also, by adjusting fittings 32, 34, the amount of fluid trapped can be adjusted which permits adjustment of the clearance distance of the brake parts. The amount of expansion and contraction of the total volume of the fluid trapped in each outlet, line and wheel cylinder connected thereto, bears a predetermined relationship to the amount of expansion and contraction of the brake shoe and drum connected to the respective line, due to variations in temperature, so as to maintain the clearance between the brake shoe and drum constant despite such variations in temperature.

It will be noted, also, as shown in Figs. 4 and 5, that the individual shoes 5 and 10 may be arranged to be operable individually and differentially by each being provided with a separate clearance distance and a separate clearance volume in the actuation of each of t e brake shoes, thus adjusting each of the same individually according to the wear on the respective brake shoes. Likewise, the expansion or contraction of the liquid applied to each of the brake shoes 5 and 10 is accommodated to the expansion or contraction fo the wheel backing plate and drum due to heating effects, thus compensating for the discrepancies in heating effects which wou'd otherwise take place in the operation of the two brake shoes on the same brake. In the form of my invention shown in Figs. 4 and 5, the operation of the brakes is the same as discussed above in connection with Figs. 1 and 3 except that in this instance the single slack adjuster casing 29 is provided for the two slack adjusters, on each of the wheels, but with a common inlet 28 and a common valve seating spring 36, the two slack adjusters being located in double opposed position, with the outer ends of the casing 29 being provided with the same length of piping leading to the brake cylinders 2 and 13 for operating the two brake shoes on each particular wheel. In this instance, also, a particular clearance volume is provided for each of the brake shoes 5 and 10 and which is adjustable by positioning the two screw-threaded outlet fittings 32 and 34, one for each of the brake shoes, and in which, if desired, the clearance distance and c'earance volume may be adjusted so as to have different clearance distances and clearance volumes for the two brake shoes, respectively, on each particular wheel.

While I have described my invention above in detail I wish it to be understood that many changes may be made therein without departing from the spirit of the same.

I claim:

1. In a vehicle wheel brake, the combination comprising, a brake drum carried for rotation with the vehicle wheel, a brake backing plate carrying a pair of brake shoes for engagement with said brake drum, a hydraulic wheel cylinder mounted on said brake for each shoe, the wheel cylinders being effective to independently urge said shoes into engagement with said drum, and a dual hydraulic slack adjuster mounted on said plate and spaced from said wheel cylinders, said dual adjuster being effective to trap volumes of fluid which are adjusted automatically to vary the released positions of the brake shoes and compensate for brake shoe wear, said dual hydraulic slack adjuster comprising a cylinder, a pair of differential pistons in said cylinder with the larger pistons facing toward the center, the space between said larger pistons forming a chamber having an inlet for admitting pressure fluid to the pistons, the remote ends of the pistons being received in chambers defined in said cylinders having outlets to the wheel cylinders, a hydraulic line connecting each outlet to a corresponding wheel cylinder, said lines being disposed closely adjacent and in heat exchange relationship to said back plate, said pistons being movable toward the outlet when fluid is admitted through the inlet, poppet valves slidable in a passage in each of the pistons, a valve spring in the space between the poppet valves and compressed between the latter to normally seat said valves in sealing engagement with the passages for cutting off the flow therethrough between the inlet and the outlets, stationary means associated with each of said pistons for unseating the valves when the respective piston is moved toward the outlet, and resilient means in the cylinder to resist said movement of the pistons, the amount of expansion and contraction of the total volume of the fluid trapped in each wheel cylinder and line bearing a predetermined relationship to the amount of expansion and contraction of the brake shoe and drum connected thereto due to variations in temperature such that the clearance between the said brake shoe and drum is maintained constant despite such variations in temperature.

2. In a vehicle wheel brake, the combination comprising, a brake drum carried for rotation with the vehicle wheel, a brake backing plate carrying a pair of brake shoes for engagement with said brake drum, a hydraulic wheel cylinder mounted on said plate for each shoe, the wheel cylinders being effective to independently urge said shoes into engagement with said drum, a dual hydraulic slack adjuster mounted on said plate and spaced from said wheel cylinders, said dual hydraulic slack adjuster comprising a cylinder, a pair of differential pistons in said cylinder with the larger pistons facing toward the center, said pistons having a passage therethrough, the space between said larger pistons forming a chamber having an inlet for admitting pressure fluid to said pistons, the remote ends of the cylinder defining chambers for the smaller pistons having outlets to the wheel cylinders, a hydraulic line connecting each outlet to a corresponding wheel cylinder and carried in heat exchange relation with said brake backing plate, a poppet valve slidably received in the passage in each of the differential pistons, a valve spring in the space between the poppet valves to normally seat said valves for cutting off the flow through the passages from the inlet to the outlets, means for opening said valves when the respective piston is moved toward the outlet by pressure fluid admitted through said inlet, and retracting springs in the cylinder to resist said movement of the pistons, so that upon return flow of pressure fluid the pistons will be returned to trap an adjustable volume of fluid in each outlet and the line and wheel cylinder connected thereto, said hydraulic lines being disposed in heat exchange relationship to said backing plate so that the temperatures of the two volumes of trapped fluid will vary with the temperature of the brake drum, shoe and backing plate, the amount of expansion and contraction of the total volume of the fluid trapped in each outlet, line and wheel cylinder, bearing a predetermined relationship to the amount of expansion and contraction of the brake shoe and drum connected thereto due to variations in temperature such that the clearance between the said brake shoe and drum is maintained constant despite such variations in temperature.

3. In a vehicle wheel brake, the combination comprising, a brake drum carried for rotation with the vehicle wheel, a brake backing plate carrying a brake shoe for engagement with said brake drum, a hydraulic wheel cylinder for engaging said shoe and drum and mounted on said plate, a hydraulic slack adjuster mounted on said plate spaced from said wheel cylinder, a hydraulic line connecting said wheel cylinder and said adjuster, said adjuster being effective to trap a volume of fluid in said wheel cylinder and line which volume of fluid is adjusted automatically to vary the released position of the brake shoe and compensate for brake shoe wear, said line and adjuster being disposed closely adjacent and in heat exchange relation to said backing plate so that the temperature of the trapped fluid varies with the temperature of the brake shoe, drum and backing plate, the amount of expansion and contraction of the total volume of the trapped fluid bearing a predetermined relationship to the amount of expansion and contraction of the brake shoe and drum due to variations in temperature such that the clearance between the brake shoe and drum is maintained constant despite such variations in temperature.

4. In a hydraulically operated brake, the combination comprising a backing plate for said brake, a hydraulic motor to actuate the brake mounted on said plate, a slack adjuster mounted on said plate spaced from said motor, a hydraulic line connected to said motor and adjuster disposed closely adjacent to and in heat exchange relationship with said plate, said adjuster being effective to trap a volume of liquid in said motor and line which volume of liquid is adjusted automatically to vary the released position of the brake shoe and compensate for brake shoe wear, the amount of expansion and contraction of the total volume of the trapped liquid bearing a predetermined relationship to the amount of expansion and contraction of the brake shoe and drum due to variations in temperature such that the clearance between the brake shoe and drum is maintained constant despite such variations in temperature.

5. In a hydraulically operated vehicle wheel brake, the combination comprising, a brake drum carried for rotation with the vehicle wheel, a brake backing plate carrying a pair of brake shoes for engagement with said brake drum, a hydraulic motor mounted on said plate for each shoe, the motors being effective to independently urge said shoes into engagement with said drum, a dual hydraulic slack adjuster mounted on said plate spaced from said motors,a hydraulic line connecting said adjuster to each of said motors, said dual adjuster being effective to independently trap a volume of fluid in each motor and line, said lines being disposed closely adjacent and in heat exchange relationship to said backing plate so that the temperature of the two lines of trapped fluid varies with the temperature of the brake drum, shoe and backing plate, and means for adjusting the effective lengths of said lines to adjust the volume of fluid trapped therein, thereby to adjust the clearance distance between the brake shoes and drum selectively for each shoe, the amount of expansion and contraction of the total volume of trapped fluid in each motor and its line bearing a predetermined relationship to the amount of expansion and contraction of the associated brake shoe and drum due to variations in temperature such that the clearance between the said associated brake shoe and drum is maintained constant despite such variations in temperature.

References Cited in the file of this patent

UNITED STATES PATENTS

| | | |
|---|---|---|
| 1,721,370 | Boughton | July 16, 1929 |
| 2,048,472 | Sanford | July 21, 1936 |
| 2,055,182 | Schultz | Sept. 22, 1936 |
| 2,064,617 | La Brie | Dec. 15, 1936 |
| 2,189,134 | Chard | Feb. 6, 1940 |
| 2,287,238 | Goepfrich | June 23, 1942 |
| 2,293,836 | Lane | Aug. 25, 1942 |
| 2,345,811 | Harp | Apr. 4, 1944 |
| 2,593,192 | Rockwell | Apr. 15, 1952 |
| 2,688,338 | Newell | Sept. 7, 1954 |

FOREIGN PATENTS

| | | |
|---|---|---|
| 358,126 | Great Britain | Oct. 8, 1931 |